United States Patent
King et al.

(10) Patent No.: US 11,915,319 B1
(45) Date of Patent: Feb. 27, 2024

(54) DIALOGUE ADVISOR FOR CLAIM LOSS REPORTING TOOL

(71) Applicant: State Farm Mutual Automobile Insurance Company, Bloomington, IL (US)

(72) Inventors: Garren King, Eureka, IL (US); Justin Devore, Atlanta, IL (US); Andrew Mathes, Eureka, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 101 days.

(21) Appl. No.: 17/242,133

(22) Filed: Apr. 27, 2021

Related U.S. Application Data

(60) Provisional application No. 63/016,746, filed on Apr. 28, 2020.

(51) Int. Cl.
*G06Q 40/08* (2012.01)
*G06N 5/04* (2023.01)
(Continued)

(52) U.S. Cl.
CPC .............. *G06Q 40/08* (2013.01); *G06N 5/04* (2013.01); *G06N 20/00* (2019.01); *G06Q 10/10* (2013.01);
(Continued)

(58) Field of Classification Search
CPC ........ G06Q 40/08; G06Q 10/10; G06N 20/00; G06N 5/04
See application file for complete search history.

(56) References Cited

U.S. PATENT DOCUMENTS

| 5,739,744 A * | 4/1998 | Roca | G06F 3/0483 345/169 |
|---|---|---|---|
| 7,941,327 B2 * | 5/2011 | Brown | G06Q 40/12 600/300 |

(Continued)

FOREIGN PATENT DOCUMENTS

WO WO2018212767 A1 11/2018

OTHER PUBLICATIONS

Assenture Insurance, "How to use AI in the insurance value chain: claims management", available at <<https://insuranceblog.accenture.com/how-to-use-ai-in-the-insurance-value-chain-claims-management>>, Sep. 11, 2018, 4 pages.

(Continued)

*Primary Examiner* — Hani M Kazimi
*Assistant Examiner* — Paul R Kloberg
(74) *Attorney, Agent, or Firm* — Lee & Hayes, P.C.

(57) ABSTRACT

During a communication session with a caller, a representative can enter information into a claim loss reporting tool to generate a loss report associated with an insurance claim. A dialogue advisor can cause the claim loss reporting tool to suggest questions that the representative should ask, and/or actions the representative should take, during the communication session. The dialogue advisor can make such suggestions, during the communication session, based at least in part on confidence levels of simulated destination predictions that correspond with destination predictions a claim router would make according to the same information associated with the loss report.

20 Claims, 7 Drawing Sheets

(51) Int. Cl.
  *G06N 20/00* (2019.01)
  *G06Q 10/10* (2023.01)
  *G06Q 30/016* (2023.01)
  *G06F 3/0483* (2013.01)
  *G06F 3/0484* (2022.01)

(52) U.S. Cl.
  CPC ......... *G06Q 30/016* (2013.01); *G06F 3/0483* (2013.01); *G06F 3/0484* (2013.01)

(56) References Cited

U.S. PATENT DOCUMENTS

| | | | | |
|---|---|---|---|---|
| 7,953,615 | B2* | 5/2011 | Aquila | G06Q 40/08 705/2 |
| 7,966,230 | B2* | 6/2011 | Brown | G06Q 10/10 600/347 |
| 8,046,281 | B1 | 10/2011 | Urrutia | G06Q 10/06 705/7.17 |
| 8,478,769 | B2* | 7/2013 | Goldfarb | G06Q 10/10 707/758 |
| 9,754,324 | B1* | 9/2017 | Scialpi | G06Q 40/08 |
| 9,792,656 | B1* | 10/2017 | Konrardy | G08G 1/164 |
| 9,947,050 | B1* | 4/2018 | Pietrus | G06Q 40/08 |
| 10,514,890 | B2* | 12/2019 | Mody | G06F 11/3664 |
| 10,884,703 | B2* | 1/2021 | Mody | G06F 18/22 |
| 2001/0011224 | A1* | 8/2001 | Brown | G16H 40/67 600/481 |
| 2004/0039750 | A1* | 2/2004 | Anderson | G06F 3/0483 |
| 2004/0107116 | A1* | 6/2004 | Brown | G06F 15/025 705/2 |
| 2007/0213608 | A1* | 9/2007 | Brown | A61B 5/14532 128/920 |
| 2007/0282639 | A1* | 12/2007 | Leszuk | G06Q 40/02 715/700 |
| 2007/0287895 | A1* | 12/2007 | Brown | G06Q 40/08 128/920 |
| 2007/0288273 | A1* | 12/2007 | Rojewski | G06Q 10/0635 705/35 |
| 2011/0196707 | A1* | 8/2011 | Danico | G06Q 40/02 705/4 |
| 2012/0095788 | A1* | 4/2012 | Simpson | G06Q 40/02 705/4 |
| 2015/0121217 | A1* | 4/2015 | O'Donoghue | B33Y 80/00 715/708 |
| 2016/0071217 | A1* | 3/2016 | Edwards | G06Q 10/063116 705/4 |
| 2016/0125546 | A1* | 5/2016 | Bostic | G06Q 40/08 705/4 |
| 2018/0005248 | A1* | 1/2018 | Koutrika | G06Q 30/0631 |
| 2018/0336638 | A1* | 11/2018 | Dziabiak | G06F 7/08 |
| 2019/0114713 | A1* | 4/2019 | Sacaleanu | G06Q 40/08 |
| 2019/0146755 | A1* | 5/2019 | Mody | G06F 11/3664 708/200 |
| 2019/0332354 | A1* | 10/2019 | Mody | G06F 7/02 |
| 2019/0362434 | A1* | 11/2019 | Gray | G06Q 40/08 |
| 2020/0320638 | A1* | 10/2020 | Erickson | G06N 20/00 |
| 2021/0027389 | A1* | 1/2021 | Jenkins | G06Q 40/08 |

OTHER PUBLICATIONS

Shreenivasa, Sanjay, "First Notification of Loss (FNOL) Machine Learning Process used for Telematics", International Journal for Scientific Research & Development, vol. 3, Iss. 12, Feb. 17, 2016, 5 pages.

* cited by examiner

500

| Initial Information | Loss Details | Vehicles & Participants | Insights | | SUBMIT |

502 — tabs; 506 — Insights; 508, 512 — SUBMIT; 510 — Notifications

Potential comparative negligence?
[ YES ] [ NO ]

Was Vehicle 1 backing up in a parking lot?
[ YES ] [ NO ]

Time of Loss
[_____ 🕐 ]

504

NOTIFICATIONS

Initial Information ✓

Loss Details ✓

Vehicles & Participants ⚠
- *Insured Driver JOHN SMITH Date of Birth field is blank*

Insights ⃠
- *Indicate whether there is potential comparative negligence*
- *Indicate whether Vehicle 1 was backing up in a parking lot*
- *Please enter a Time of Loss*

FIG. 5

DIALOGUE ADVISOR FOR CLAIM LOSS REPORTING TOOL

RELATED APPLICATIONS

This U.S. Patent application claims priority to provisional U.S. Patent Application No. 63/016,746, entitled "Dialogue Advisor for Claim Loss Reporting Tool," filed on Apr. 28, 2020, the entirety of which is incorporated herein by reference.

TECHNICAL FIELD

The present disclosure relates to a claim loss reporting tool, and more particularly, to a dialogue advisor that can identify, within the claim loss reporting tool, questions for a representative to ask and/or actions for the representative to perform during a communication session with a caller.

BACKGROUND

When a loss occurs, for example via an automobile accident or other type of incident, an individual can contact a representative of an insurance company to report the loss and/or file an insurance claim. For example, a caller, such as a customer of the insurance company, a third-party claimant, or another party, can call a claim handler or other representative of the insurance company. The representative may ask the caller questions about the loss to obtain information about the loss. For example, the representative may ask the caller when an accident occurred, where the accident occurred, which parties were involved in the accident, and/or other questions. The representative can enter information received from the caller into a loss report, such as a "first notice of loss" (FNOL) or other type of report associated with an insurance claim.

In some situations, representatives may use claim loss reporting tools when initially speaking to callers about reported losses. For example, a representative can use a software-based claim loss reporting tool via user interface (UI) on a computer or other device. During a call or other communication session with a caller, a representative can use the UI to enter information about the loss into the claim loss reporting tool. The claim loss reporting tool, or an associated component, can thus use the entered information to generate a loss report. The UI of a claim loss reporting tool may display questions that the representative should ask the caller, or otherwise identify missing information that the representative should ask about, during a communication session with the caller.

In some existing systems, the claim loss reporting tool displays suggested questions based on a pre-written script and/or a preconfigured and static logic tree. For example, some existing claim loss reporting tools can have a static logic tree such that if a caller answers "yes" to a certain predefined question, the claim loss reporting tool may follow a corresponding branch of the static logic tree to suggest that the representative ask one or more predefined follow-up questions in that branch of the logic tree.

After a loss report associated with an insurance claim has been taken, the insurance claim can be routed for further processing to a department or group in the insurance company, or a specific claim handler, for further processing. A decision about where to route a new insurance claim for further processing can be based, at least in part, on information about the claim that has been recorded by the representative in the loss report. For instance, if a loss report associated with a new insurance claim indicates that multiple parties were involved in an accident, a claim routing system may determine that a claim handler who specializes in subrogation and/or comparative negligence issues may be more suited to handle that new insurance claim than another claim handler who has less experience with those types of issues.

However, if not enough questions, and/or insufficient questions, are asked when a representative takes a loss report, the loss report may not include sufficient information for a routing system to make an optimal claim routing decision. Accordingly, a claim may be routed to a destination that may process the claim more slowly, and/or with inferior results, than another destination could have processed the claim.

For example, a situation associated with a loss may have involved multiple parties. If a representative did not ask questions that might reveal a potential that comparative negligence issues may be associated with the loss, the loss report may not include enough information for a claim routing system to determine that the claim may involve such comparative negligence issues. Accordingly, due to insufficient information in the loss report about the potential for comparative negligence, the claim routing system may not recognize the potential for comparative negligence in the claim. The claim routing system may in turn route the insurance claim to a first claim handler with a relatively low amount of experience handling comparative negligence issues, even though a second claim handler with more experience handling comparative negligence issues may have been able to process the insurance claim faster and/or with better results. In various examples, the first claim handler who is initially assigned the claim may take longer to process the claim than the second claim hander would have, or the first claim handler may choose to later reassign the claim to the second claim handler once the first claim handler determines that the second claim handler is better suited to handle the claim. This can lead to increased claim processing times overall, increased usage of computing resources by both the first claim handler and the second claim handler, and increased usage of network bandwidth to transmit claim data between computing devices associated with the first claim handler and the second claim handler.

The example systems and methods described herein may be directed toward mitigating or overcoming one or more of the deficiencies described above.

SUMMARY

The systems and methods described herein can be used to identify questions that can be asked, during an initial communication session between a representative and a caller associated with an insurance claim, that can lead to an increased confidence level in a claim destination prediction made by a claim router. The systems and methods described herein can also identify an action that can be taken by the representative, during the initial communication session, when a confidence level in a destination prediction is likely to be above a threshold, instead of waiting to perform that action during a second communication session after the claim has been routed to a destination. Overall, the systems and methods described herein can increase efficiency and reduce delays in claim intake systems and claims handling processes overall.

According to a first aspect, a computer-implemented method can include generating, by one or more processors, a preliminary destination prediction of a destination, selected from a set of possible destinations, for claim data associated with an insurance claim. The preliminary destination prediction can be generated based on current information in a loss report associated with the insurance claim, and can be associated with a first confidence level. The method can also include identifying, by the one or more processors, an empty field in the loss report, and determining, by the one or more processors, a set of possible values for the empty field. The method can further include generating, by the one or more processors, one or more theoretical destination predictions, wherein the one or more theoretical destination predictions have second confidence levels and are based on the current information in the loss report and the set of possible values for the empty field. The method can also include determining, by the one or more processors, that the second confidence levels of the one or more theoretical destination predictions are greater than the first confidence level of the preliminary destination prediction. The method can also include causing, by the one or more processors, a claim loss reporting tool to display at least one user interface element that requests a value for the empty field, based on determining that the second confidence levels are greater than the first confidence level.

According to a second aspect, a computer-implemented method can include generating, by one or more processors, a preliminary destination prediction of a likely destination, selected from a set of possible destinations, for claim data associated with an insurance claim. The preliminary destination prediction can be generated based on current information in a loss report associated with the insurance claim, and can be associated with a confidence level. The method can also include determining, by the one or more processors, that the confidence level is above a predefined threshold. The method can further include identifying, by the one or more processors, an action associated with the likely destination. The method can also include causing, by the one or more processors, a claim loss reporting tool to display a prompt requesting that a representative perform the action during a current communication session between the representative and a caller.

According to a third aspect, one or more computing devices can comprise at least one processor and memory storing computer executable instructions that, when executed by the at least one processor, cause the at least one processor to perform operations. The operations can include accepting user input, via a claim loss reporting tool, from a representative during a communication session with a caller. The user input can be associated with a loss reported by the caller. The operations can also include generating a loss report associated with an insurance claim, based on the user input. The operations can further include generating simulated destination predictions of a destination, selected from a set of possible destinations, for claim data associated with the insurance claim, based on the loss report. The simulated destination predictions can correspond with destination predictions that a claim router would generate based on the loss report. The operations can also include displaying, via the claim loss reporting tool, one or more of a user interface element or a prompt. The user interface element can request additional user input, during the communication session, associated with a currently-empty field of the loss report. The prompt can request performance of an action, by the representative during the communication session, associated with the destination indicated in at least one of the simulated destination predictions.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 5 shows an example user interface for a claim loss reporting tool.

DETAILED DESCRIPTION

Figure 1:
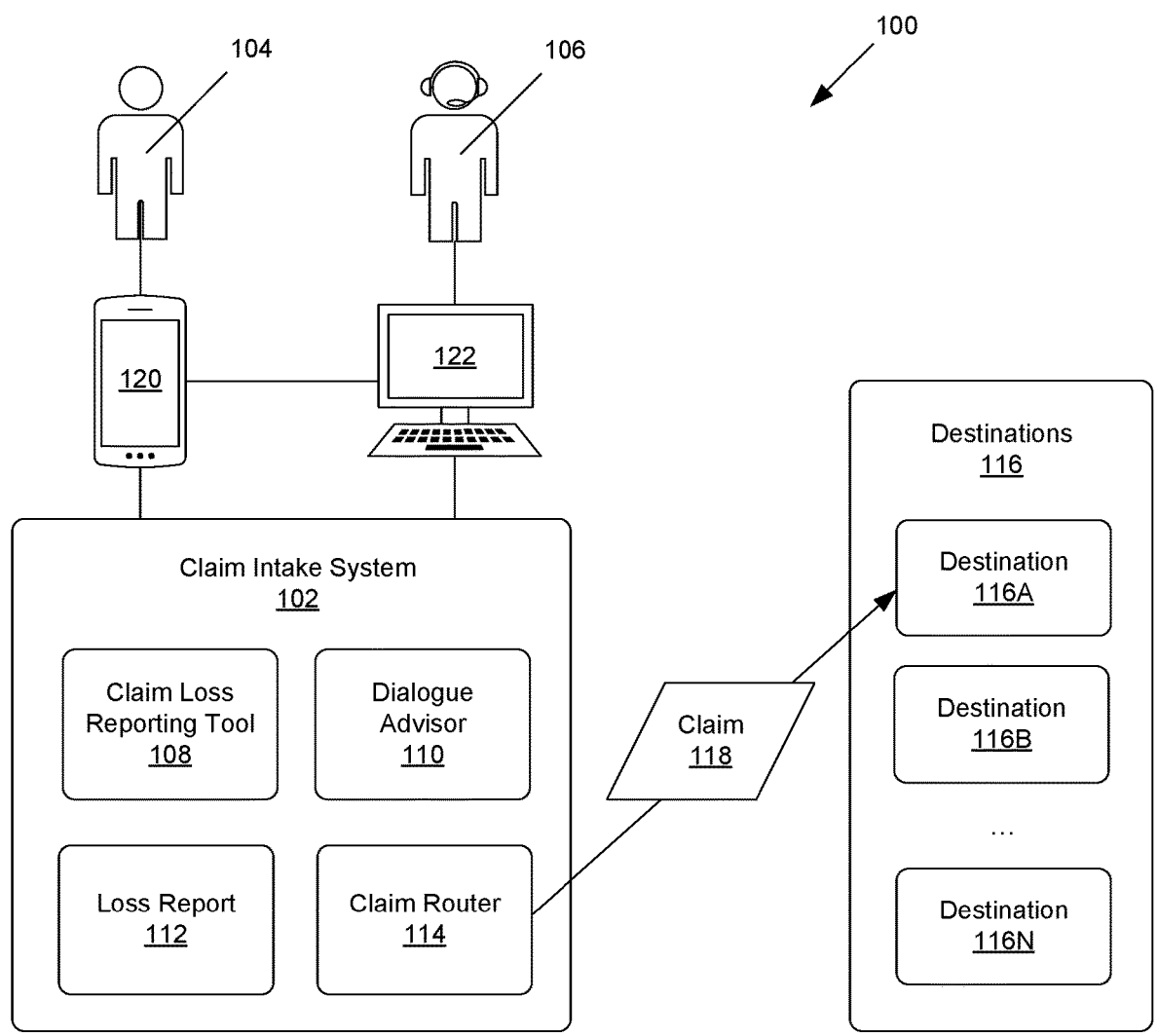
FIG. 1 shows an example of a claim intake system.

FIG. 1 shows an example 100 of a claim intake system 102. When a caller 104 wants to report a loss and/or file an insurance claim with an insurance company, the caller 104 can engage in a communication session with a representative 106 of the insurance company. The representative 106 may use a claim loss reporting tool 108 of the claim intake system 102 during the communication session with the caller 104. In some examples, the representative may ask questions, and/or perform actions, suggested by a dialogue advisor 110 of the claim intake system 102 during the communication session with the caller 104. Based on information provided to the claim loss reporting tool 108 during the communication session, the claim loss reporting tool 108 can generate a loss report 112. A claim router 114 of the claim intake system 102 can use the loss report 112 to select a particular destination, out of a set of possible destinations 116 for claims within the insurance company, for a claim 118 associated with the loss report 112. The claim intake system 102 can thereby cause claim data associated with the claim 118, such as the loss report 112 and/or other information, to be routed within the insurance company to the selected destination. As will be described further below, the dialogue advisor 110 can generate questions, action instructions, and/or other information to be displayed within the claim loss reporting tool 108 based at least in part on predictions of questions and/or actions that may be likely to increase a confidence level in the selection, by the claim router 114, of the destination for the claim 118.

The caller 104 may be a customer of the insurance company, a third-party claimant, or other party. For example, the caller 104 may be an individual who wants to file a claim for a loss incurred in an accident other incident, such as an automobile insurance claim, a fire insurance claim, a life insurance claim, a home insurance claim, or other type of insurance claim.

The representative 106 can be a claim handler, claims adjustor, customer assistance associate, call center representative, operator, or other type of worker who has access to the claim loss reporting tool 108 and/or other elements of the claim intake system 102. In some examples, the representative 106 can be a worker in a call center or other contact center staffed with multiple representatives. In other examples, the representative 106 can use the claim intake system 102 in a smaller environment, such as in an office where a receptionist serves as the representative 106.

The caller 104 can use a communication device 120 to initiate the communication session with the representative 106. In some examples, the communication device 120 can be a telephone, such as a smartphone, another type of mobile phone, or a landline phone. In other examples, a communication device 120 can be any other type of device that can engage in calls or other types of communications, including a personal digital assistant (PDA), a personal computer (PC) such as a laptop, desktop, or workstation, a media player, a tablet computer, a gaming device, a smart watch, or any other type of computing or communication device.

The representative 106 can have a terminal 122 through which the representative 106 can access the claim loss reporting tool 108 during the communication session with the caller 104. The terminal 122 can be a computing device, such as laptop, desktop, workstation, tablet, or any other computing device. In some examples, the representative 106 may engage in the communication session with the caller 104 through the terminal 122, such as by engaging in a chat session through the terminal 122 or engaging in a Voice Over IP (VoIP) call or other type of digital audio communication through the terminal 122. However, in other examples, the representative 106 may engage in a call or other type of communication session through a telephone, telephone headset, or other communication device, similar to communication device 120, but may also use the terminal 122 to access the claim loss reporting tool 108 during the communication session.

In some examples, the communication session between the caller 104 and the representative 106 can be telephone call. However, in other examples, the communication session between the caller 104 and the representative 106 can be a text-based chat session, a video chat session, and/or any other type of communication session.

During the communication session about the loss, the representative 106 can ask the caller 104 questions about the loss, perform actions such as taking a recorded statement from the caller 104 or requesting documents from the caller 104, and/or otherwise obtain information from the caller 104 about the loss. The representative 106 can enter information into the claim loss reporting tool 108 during the communication session.

For example, the claim loss reporting tool 108 can have a UI that includes text fields, check boxes, dialog boxes, and/or other UI elements by which the claim loss reporting tool 108 can receive input entered by the representative 106, such as input based on a caller's answers to questions posed by the representative 106 during the communication session. As another example, the representative 106 can enter information into the claim loss reporting tool 108 that the caller 104 voluntarily provides without being prompted to do so by the representative 106, such as details from an initial description of an accident that the caller 104 provides during the communication session before the representative 106 asks any questions. In still other examples, the representative 106 can enter other information into the claim loss reporting tool 108 that was not received directly from the caller 104. For example, the representative 106 may enter subjective input about whether the representative 106 believes a loss may be associated with potential comparative negligence issues, or that the representative 106 believes a claim may potentially be fraudulent.

In some examples, the claim loss reporting tool 108, or another element of the claim intake system 102, may have natural language processing and/or speech recognition components that can recognize words used during the communication session. For instance, such natural language processing and/or speech recognition components may be configured to, instead of or in addition to data entered by the representative 106, automatically add data to the loss report 112 substantially in real-time based on words recognized during the communication session.

The loss report 112 may be an FNOL, or other type of report or data structure that can store information about the loss and/or the corresponding claim 118. For example, the claim 118 may be an insurance claim for the loss, and the loss report 112 may include information associated with the claim, including information about the loss, information about parties associated with the loss, information about insurance coverage of the parties, and/or other information about the loss.

The loss report 112 may have numerous fields, features, or other data elements that can potentially be filled in with values using data received through the claim loss reporting tool 108. Some fields of the loss report 112 may be mandatory, such that the claim loss reporting tool 108 requires values to be provided for those fields. Other fields of the loss report 112 may be optional or recommended, but not be mandatory. In some examples, various fields of the loss report 112 may be mandatory, optional, or irrelevant depending on the situation or type of loss. For instance, some fields of the loss report 112 may only be relevant for certain types of losses, certain loss situations, certain jurisdictions, and/or other circumstances. As an example, a field of the loss report 112 about a type of weather that was occurring during an accident may be highly relevant to an automobile accident that occurred outdoors during a storm, but may not be relevant to a similar automobile accident that occurred in an indoor parking garage.

Accordingly, in many situations, some fields of the loss report 112 may be left empty. For instance, if a particular field of the loss report 112 is not relevant to a particular claim, the claim loss reporting tool 108 may be configured to not present UI elements associated with that particular field of the loss report 112, and the particular field may be left empty due to the absence of any user input associated with the particular field via the claim loss reporting tool 108. Similarly, because some underlying fields of the loss report 112 may be specific to certain situations or types of claims, some fields may commonly be left empty unless a claim relates to a specific and/or unusual situation. For example, if the claim loss reporting tool 108, or the dialogue advisor 110, determines that a certain field of the loss report 112 is relevant to the claim 118, as discussed further below, the claim loss reporting tool 108 can display UI elements associated with that field of the loss report 112 that might not otherwise be displayed in the UI.

As will be described in more detail below, the dialogue advisor 110 of the claim intake system 102 can interface with the claim loss reporting tool 108 to dynamically suggest questions that the representative 106 should ask the caller 104 during the communication session, dynamically suggest actions that the representative 106 should take during the communication session, and/or dynamically provide other information to the representative 106 during the communication session. The claim loss reporting tool 108 may, for example, cause information to be displayed in a UI about suggested questions, suggested actions, or other information provided by the dialogue advisor 110. Questions and/or actions dynamically suggested by the dialogue advisor 110 to the claim loss reporting tool 108 can accordingly impact behavior of the representative 106 during the communication session with the caller 104, and in turn impact the types of information entered into the loss report 112 during that communication session. For example, as will be described further below, the dialogue advisor 110 may identify one or more currently-empty fields of the loss report 112, and may cause the claim loss reporting tool 108 to display UI elements that correspond with the identified currently-empty fields of the loss report 112. For instance, the dialogue advisor 110 may prompt the claim loss reporting tool 108 to display UI elements that suggest that the representative 106 ask the caller 104 certain questions to obtain values for one or more identified currently-empty fields.

In some examples, the dialogue advisor 110 may be an integrated element of the claim loss reporting tool 108. However, in other examples, the dialogue advisor 110 can be a separate element, such as plug-in or a separate application, that can interface with the claim loss reporting tool 108. For example, the dialogue advisor 110 can be an add-on application or enhancement to a claim loss reporting tool provided by a vendor or other third-party.

Based at least in part on information within one or more fields of the loss report 112, the claim router 114 can select a destination for the claim 118 associated with the loss report 112. There may be many possible destinations 116 for the claim 118, and/or the corresponding loss report 112, such as destinations 116A, 116B, . . . 116N, etc. shown in FIG. 1. Different destinations 116 may be associated with different workers, or different groups of workers, who could potentially be assigned to at least partially process claims. For example, different destinations 116 may be different individual workers, or may be associated with different groups, segments, or teams within the insurance company. Workers associated with some destinations may be more experienced and/or skilled at handling certain types of claims than workers associated with other destinations. Accordingly, the claim router 114 can use information in the loss report 112 associated with the claim 118 to predict which destination, selected from the set of available destinations 116, is best suited to handle the claim 118 and/or perform a next action involved in processing the claim 118. In some examples, the claim router 114 can route claim data associated with the claim 118, such as the loss report 112 and/or other corresponding claim information, to the selected destination for further processing. In other examples, the claim router 114 can cause another element to route the claim data to the selected destination for further processing.

For example, the representative 106 may be a claim handler who receives a call from the caller 104 and uses the claim loss reporting tool 108 to generate the loss report 112 associated with the claim 118. Thereafter, the claim 118 and/or the loss report 112 can be routed by the claim router 114 to a queue for a different claim handler or claim adjuster, selected as the destination for the claim 118 by the claim router 114, who can take further steps to at least partially process the claim 118. For instance, a selected destination for an automobile insurance claim can be associated with a specific claim handler who can determine whether parties have insurance coverage, determine how much insurance coverage parties have, determine which party is at fault, determine if multiple parties are at fault in a comparative negligence situation, determine amounts to be paid to one or more parties, negotiate with insurers of other insured parties during subrogation situations, and/or take other actions to at least partially process and/or resolve the automobile insurance claim. In some examples, the selected claim handler may use information in the loss report 112 when taking later actions with respect to the claim 118.

As another example, the claim router 114 may, based on information in the loss report, route the claim 118 to a destination associated with a particular team of claim handlers who specialize in a certain type of claim. For instance, the claim router 114 may use information in the loss report 112 to determine that the claim 118 is likely to involve subrogation. Accordingly, in this example, the claim router 114 may route the claim 118 to a destination associated with a specific team of claim handlers that specializes in subrogation negotiations.

As will be discussed further below with respect to FIG. 2 and FIG. 3, the claim router 114 can generate a destination prediction indicating which of the destinations 116 is best suited to process the claim 118, and the claim 118 can be routed to that destination. However, the dialogue advisor 110 can be configured to dynamically suggest questions and/or actions, during the communication session with the caller 104, that may increase the confidence level of the destination prediction generated by the claim router 114. For example, the dialogue advisor 110 can proactively cause the representative 104 to ask questions and/or take actions that enhance the information in the loss report 112 in ways that lead to an increase in the confidence level of the destination prediction that will later be used to route the corresponding claim 118.

Such increases in the confidence level of the destination prediction can reduce the number of downstream reassignments. For example, if a claim is assigned to first destination based on destination prediction with a relatively low confidence level, there may be a relatively high chance that the claim would then be transferred or reassigned by the first destination to a second destination. However, increasing the confidence level of the destination prediction based on questions and/or actions suggested by the dialogue advisor 110 can increase the likelihood that the destination selected by the claim router 114 is the best destination for the claim 118, and reduce the likelihood that the claim 118 will be reassigned from that selected destination to another destination.

Accordingly, the initially-selected destination can process the claim 118 more quickly, and fewer computer resources can be used to process the claim 118 overall, relative to if the claim 118 is reassigned to one or more other destinations. For instance, by routing the claim 118 to the best-suited destination initially, bandwidth usage associated with downstream reassignments, such as sending data associated with the claim 118 across a network to one or more other destinations than an initially-selected destination, can be reduced.

As a non-limiting example, if the claim is initially assigned to a group that does not normally handle comparative negligence issues based on a low-confidence destination prediction, the initially-assigned group may later reassign the claim to another group that specializes in comparative negligence issues if the initially-assigned group determines that the claim involves comparative negligence issues. However, the dialogue advisor 110 instead suggests questions to the representative 106 that cause the caller 104 to provide additional information during the communication session indicating that the claim 118 may involve comparative negligence issues, the additional information may cause the claim router 114 to instead predict, with a higher confidence level, that the claim 118 should be initially assigned to the group that specializes in comparative negligence issues.

Accordingly, by initially assigned the claim 118 to this group, the claim 118 may be processed more quickly without being reassigned.

Figure 2:
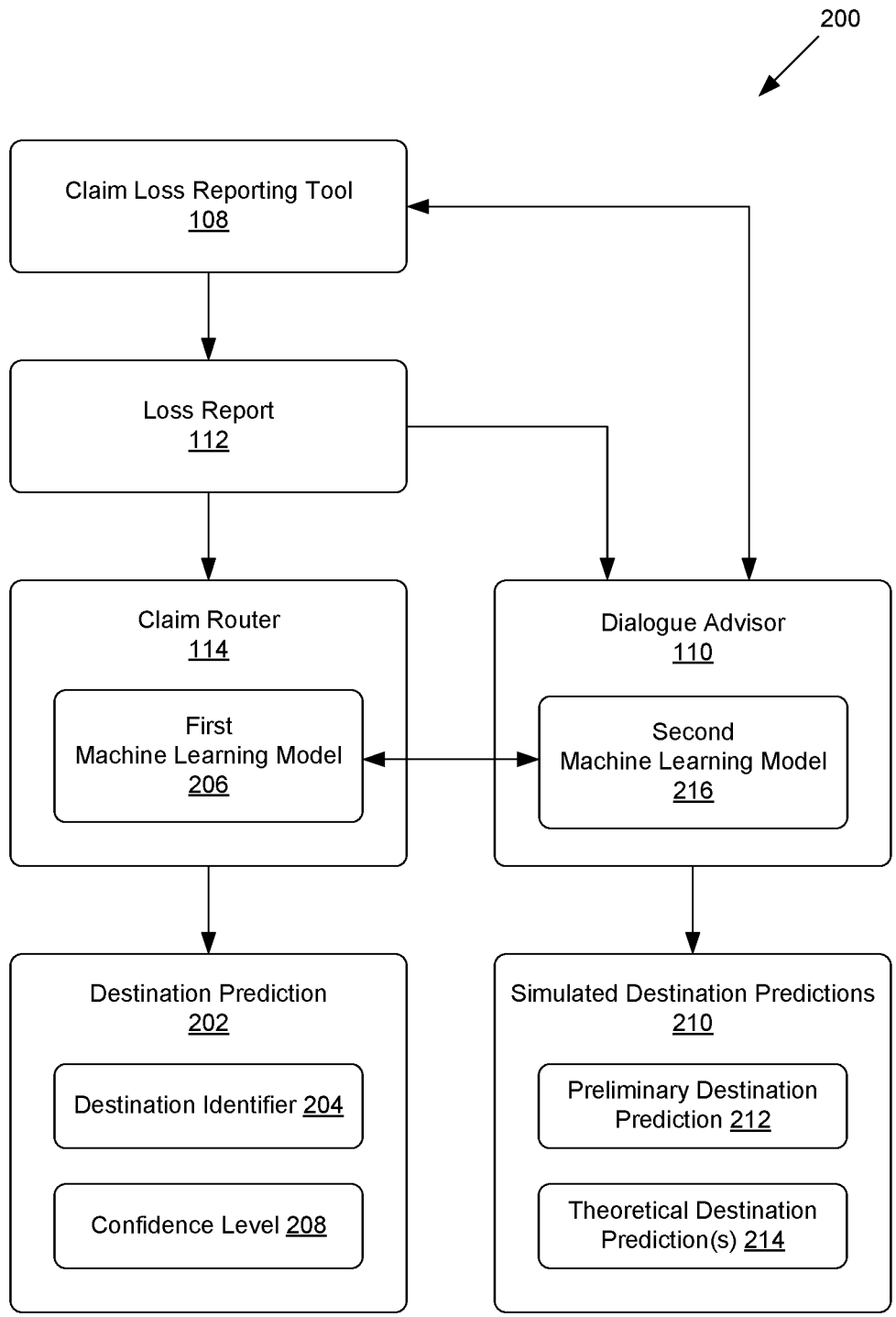
FIG. 2 shows an example of a claim router using a loss report, generated via a claim loss reporting tool, to make a destination prediction.

FIG. 2 shows an example 200 of the claim router 114 using the loss report 112, generated via the claim loss reporting tool 108, to make a destination prediction 202. The destination prediction 202 can include a destination identifier 204 that identifies, out of the set of possible destinations 116 for the claim 118 as shown in FIG. 1, a selected destination for that claim 118.

In some examples, the claim router 114 can have a first machine learning model 206 or other artificial intelligence system configured to, based on information in fields of the loss report 112, predict which destination, out of the set of possible destinations 116, is most suited to process the associated claim 118. For example, the first machine learning model 206 can predict which destination, if assigned the claim 118 associated with the loss report 112, will best meet operational goals, timing goals, and/or other targets associated with processing the claim 118.

For example, if information in the loss report 112 indicates that multiple parties were involved in an accident, and thus that comparative negligence issues may be involved during processing of the associated claim 118, the first machine learning model 206 of the claim router 114 may predict that a team, or a specific claim handler, that has a threshold level of experience with comparative negligence issues is a more suitable destination for that claim 118 than a different team or claim handler that has less experience with comparative negligence issues. The destination prediction 202 of which destination is most suitable for the claim 118 may be based on which destination is predicted to process the claim 118 most quickly, which destination has the most experience with a claim type associated with the claim 118, which destination has the highest skill proficiency rating with a type of skill likely to be involved in processing the claim 118, which destination is best equipped to handle a next processing step within a life cycle of the claim 118, and/or any other factor.

In some examples, the first machine learning model 206 can be trained on a training set of data to determine weights for a set of factors associated with the destinations 116 and/or loss reports. These weights can be used by the first machine learning model 206 to predict which destination is most suitable for a claim. In some examples, the first machine learning model 206 can be trained using a supervised machine learning approach. For example, a training set of data can be provided that includes numerous data points associated with previous claims, including data points from previous corresponding loss reports, data points about the destinations 116, data points about how the destinations 116 handled previous claims, and/or other types of data points. Such data points can be referred to as "features" for machine learning algorithms. Targets, goals, or optimal outcomes can be established for how the destinations 116 process claims, and supervised learning algorithms can determine weights for different features and/or different combinations of features from the training set that optimize prediction of the target outcomes. For instance, the underlying machine learning algorithms can detect which combinations of features in the training set are statistically more relevant to predicting target outcomes, and/or determine weights for different features, and can thus prioritize those features in relative relation to each other. After the first machine learning model 206 has been trained, the trained first machine learning model 206 can be used to infer a probabilistic outcome when the trained first machine learning model 206 is presented new data of the type on which it was trained.

For example, supervised machine learning techniques can be used to determine correlations and/or weightings between elements of previous loss reports and previous results indicating how different destinations ultimately handled claims associated with the previous loss reports. In various examples, such supervised machine learning can be based on recurrent neural networks or other types of neural networks, nearest-neighbor algorithms, support-vector networks, linear regression, logistic regression, other types of regression analysis, decision trees, and/or other types of artificial intelligence or machine learning frameworks. In other examples, unsupervised machine learning techniques can be used to derive correlations and/or relationships between elements or attributes of loss reports and/or destinations 116.

As discussed above, the destination prediction 202 made by the claim router 114 can include the destination identifier 204 that indicates a particular destination, of the destinations 116, selected by the claim router 114 for the claim 118. The destination prediction 202 can also have, or be associated with, a confidence level 208. For example, if the claim router 114 predicts that a first destination will be able to process the claim 118 more quickly and/or more efficiently than a second destination, the destination prediction 202 can have a destination identifier associated with the first destination and have a relatively high confidence level 208. However, if the claim router 114 predicts, based on information in the loss report 112, that two destinations may process the claim 118 roughly equally, the claim router 114 may generate a destination prediction with a destination identifier that indicates a selected one of the two destinations, but the confidence level 208 for that destination prediction may be relatively low.

Because the claim router 114 is configured to make the destination prediction 202 for the claim 118 based on information in the corresponding loss report 112, information present in the loss report 112 can impact the confidence level 208 of the destination prediction 202. For instance, if the loss report 112 contains information indicating the potential for comparative negligence issues with respect to a loss, the claim router 114 may make the destination prediction 202 with a relatively high confidence level indicating that the associated claim 118 should be routed to a destination that specializes in comparative negligence issues. However, the claim router 114 may instead make the destination prediction 202 with a lower confidence level if the loss report 112 instead omits information that would assist the claim router 114 in determining whether comparative negligence issues are likely to be associated with the claim 118. Accordingly, a change in the information in the loss report 112 can change the confidence level 208 of the destination prediction 202 the claim router 114 would generate based on the loss report 112.

As discussed above, the dialogue advisor 110 can cause a UI of the claim loss reporting tool 108 to present, substantially in real-time during the communication session between the caller 104 and the representative 106, indications of suggested questions, suggested actions, and/or other information for the representative 106. The dialogue advisor 110 can use machine learning techniques, other types of artificial intelligence, and/or rules-based models to determine suggested questions and/or actions for the representative 106 that can be presented through the UI of the claim loss reporting tool 108, for instance to assist with presenting a guided workflow for the representative 106. In some examples, the dialogue advisor 110 may cause the claim loss reporting tool 108 to display pre-written questions or action prompts, associated with types of information that the dialogue advisor 110 determines should be obtained from the caller 104, during the communication session. In other examples, the dialogue advisor 110 may cause the claim loss reporting tool 108 to, during the communication session, display indications of the types of information that the dialogue advisor 110 determines should be obtained from the caller 104, and thereby prompt the representative 106 to ask the caller 104 for the identified types of information in the representative's own words. The dialogue advisor 110 can determine such questions, actions, or other information during the communication session based, at least in part, on simulated destination predictions 210.

One of the simulated destination predictions 210 can be a preliminary destination prediction 214. The preliminary destination prediction 212 can correspond with the destination prediction 202 that the claim router 114 would generate according to current information in the loss report 112 that has been collected so far during the communication session.

The simulated destination predictions 210 can also include one or more theoretical destination predictions 214. The theoretical destination predictions 214 can correspond with destination predictions that the claim router 114 would produce if current information in the loss report 112 were altered in one or more ways based on possible questions the representative 106 could ask, and/or actions the representative 106 could take, during the communication session.

In some examples, dialogue advisor 110 may generate the simulated destination predictions 210. For example, as shown in FIG. 2, the dialogue advisor 110 can have, or have access to, a second machine learning model 216. The second machine learning model 216 may be a copy of the first learning model 206 used by the claim router 114. For instance, the dialogue advisor 110 can have a copy of the trained first machine learning model 206 used by the claim router 114, such that the second machine learning model 216 used in the dialogue advisor 110 includes copies of weights for various data elements considered within the trained first machine learning model 206. In other examples, the first machine learning model 206 and the second machine learning model 216 can be a shared machine learning model that executes in the claim intake system 102 outside the claim router 114 or the dialogue advisor 110, such that the claim router 114 can use the shared machine learning model as the first machine learning model 206 and the dialogue advisor 110 can use the shared machine learning model as the second machine learning model 216.

The dialogue advisor 110 can use the second machine learning model 216 to generate, based on current information within the loss report 112 and/or additional information that could potentially be added to the current loss report 112, the simulated destination predictions 210 that substantially match destination predictions the claim router 114 would generate based on the same information. Accordingly, the dialogue advisor 110 can use the second machine learning model 216 to generate the preliminary destination prediction 212 based on information currently in the loss report 112, and the theoretical destination predictions 214 based on the current loss report 112 plus one or more additional values that could potentially be added to the current loss report 112.

In other examples, the simulated destination predictions 210 used by the dialogue advisor 110 can be destination predictions that are generated by the claim router 114 based on current and/or potential information within the loss report 112. For example, destination predictions generated by the claim router 114 during the communication session can be provided to the dialogue advisor 110 as simulated destination predictions 210. However, the claim router 114 can be configured to not act on such destination predictions to actually route the claim 118, until the loss report 112 is finalized and submitted through the claim loss reporting tool 108.

Each of the simulated destination predictions 210, made by the dialogue advisor 110 or the claim router 114, using current or potential information in a loss report 112, can be similar to the destination prediction 202. For instance, the preliminary destination prediction 212 and each of the theoretical destination predictions 214 can have a destination identifier and be associated with a confidence level. Similar to the destination identifier 204, destination identifiers of the simulated destination predictions 210 can indicate destinations that the claim router 114 would select for the associated claim 118.

Additionally, each of the simulated destination predictions 210 can be associated with a confidence level, similar to the confidence level 208 of the destination prediction 202. The confidence levels of the simulated destination predictions 210 can be determined based on the current or potential information in the loss report 112 used to generate the simulated destination predictions 210. Accordingly, changes in the current or potential information in the loss report 112 used to generate the simulated destination predictions 210 can change the associated simulated confidence levels of the simulated destination predictions 210. For example, if the representative 106 receives new details from the caller 104 indicating that multiple parties were involved in an accident, and enters that information into the loss report 112, the confidence level of a simulated destination prediction identifying a destination that specializes in comparative negligence may increase, relative to the confidence level of a prior simulated destination prediction that was generated before the multiple-party information was added to the loss report 112.

The dialogue advisor 110 can determine a confidence level of the preliminary destination prediction 212 generated based on current information in the loss report 112. The dialogue advisor 110 can also determine confidence levels of one or more theoretical destination predictions 214 generated based at least in part on possible additional values that could be added to the current information in the loss report 112. If any of the theoretical destination predictions 214 have a higher confidence level than the current preliminary destination prediction 212, the dialogue advisor 110 can determine that adding one of the possible additional values to the current loss report 112 would likely increase the confidence level 208 of the destination prediction 202 that the claim router 114 will ultimately make once the loss report 112 is finalized and submitted. Accordingly, as discussed further below with respect to FIG. 3, the dialogue advisor 110 can cause the claim loss reporting tool 108 to prompt the representative 106 to ask the caller 104 a question, or take other actions, to obtain information by which one of the possible additional values to the current loss report 112.

Figure 3:
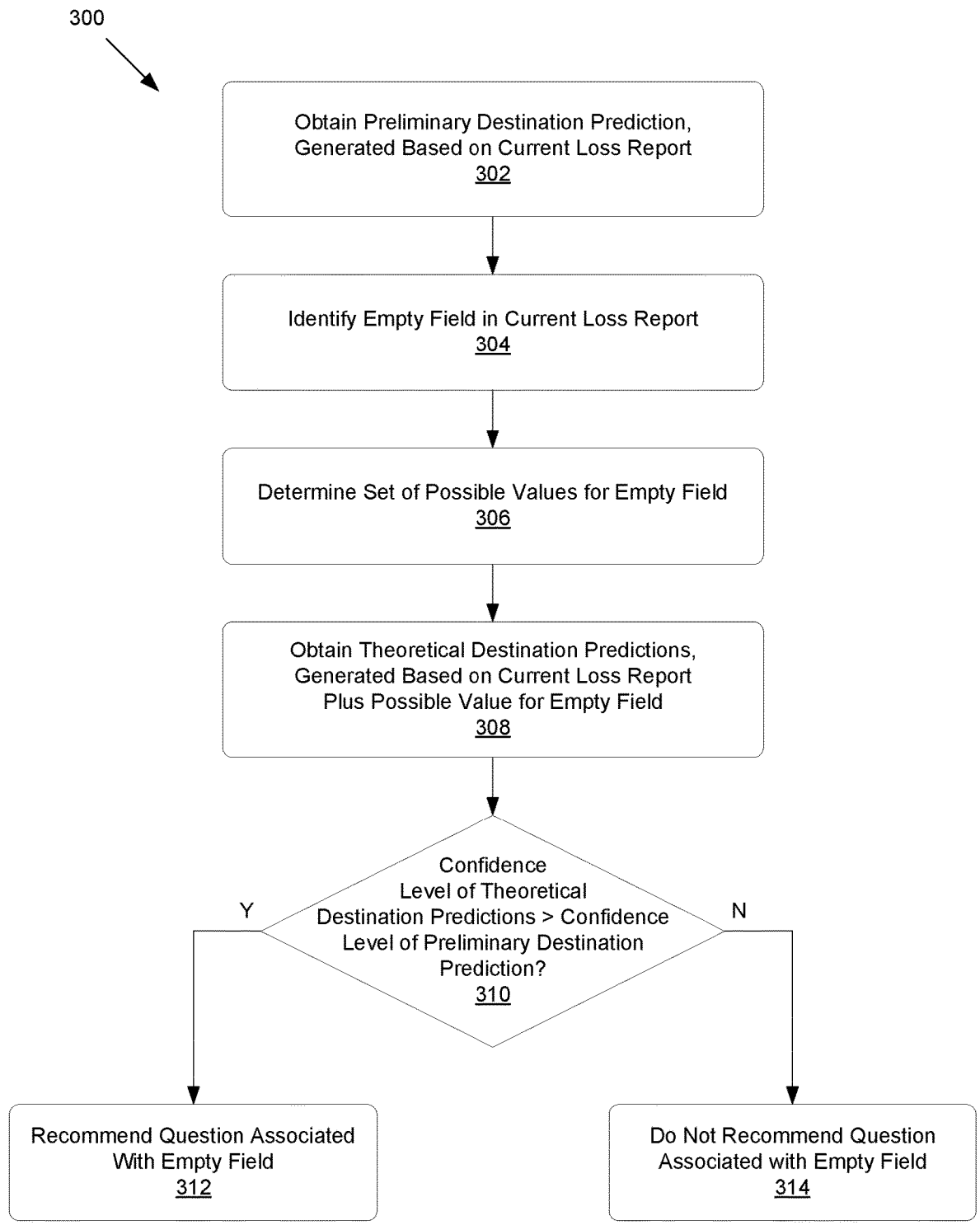
FIG. 3 shows a flowchart of a process by which a dialogue advisor can determine whether to recommend a question to a representative via a claim loss reporting tool.

FIG. 3 shows a flowchart of a process 300 by which the dialogue advisor 110 can determine whether to recommend a question to the representative 106 via the claim loss reporting tool 108. During process 300, the dialogue advisor 110 can be executed by at least one computing system, such as the computing device described below with respect to FIG. 7. The dialogue advisor 110 can determine whether to recommend a question based at least in part on whether confidence levels of one or more theoretical destination predictions 214 are greater than the confidence level of the preliminary destination prediction 214 discussed above with respect to FIG. 2.

At block 302, the dialogue advisor 110 can obtain the preliminary destination prediction 212 based on current information in the loss report 112. In some examples, the dialogue advisor 110 can itself generate the preliminary destination prediction 212 using the second machine learning model 216. As discussed above, the second machine learning model 216 can be a copy of the first machine learning model 206 used by the claim router 114, such that the preliminary destination prediction 212 substantially matches the destination prediction 202 that the claim router 114 would produce based on the current information in the loss report 112. In other examples, the dialogue advisor 110 can access a draft destination prediction generated by the claim router 114 based on the current information in the loss report 112, and use the draft destination prediction as the preliminary destination prediction 212.

At block 304, the dialogue advisor 110 can identify an empty field within the current loss report 112. For example, dialogue advisor 110 may determine that a particular field of the loss report 112 has not yet been filled in, for example because no corresponding UI element has been presented in the claim loss reporting tool 108, and identify that field of the loss report 112 as an empty field at block 304.

At block 306, the dialogue advisor 110 can identity a set of possible values for the empty field identified at block 304. For example, if the field is a binary field that accepts a "yes" or "no" value, the set of possible values for the empty field can include a "yes" value and a "no" value. As another example, if the field accepts integer values ranging from 0 to 10, the set of possible values for the empty field can include the integer values from 0 to 10.

At block 308, the dialogue advisor 110 can obtain a set of theoretical destination predictions 214 that are each generated based on a modified version of the loss report 112 that includes the current information plus a value, of the set of possible values, filled into in the currently-empty field. For example, the dialogue advisor 110 can create, or cause the claim router 114 to create, one or more theoretical destination predictions 214 using different values of the set of possible values for the currently-empty field. As a non-limiting example, if the set of possible values includes a "yes" value and a "no" value for the empty field, the dialogue advisor 110 can obtain two theoretical destination predictions 214 based on a first potential version of the loss report 112 that adds the "yes" value to the currently-empty field and a second potential version of the loss report 112 that adds the "no" value to the currently-empty field.

At block 310, the dialogue advisor 110 can compare the confidence level of the preliminary destination prediction 212 obtained at block 302 against confidence levels of the one or more theoretical destination predictions 214 obtained at block 308. If the confidence levels of the theoretical destination predictions 214 are greater than the confidence level of the preliminary destination prediction 212 (Block 310—Yes), the dialogue advisor 110 can determine that it would be beneficial to ask the caller 104 a question associated with the currently-empty field of the loss report 112. For example, the confidence levels of the theoretical destination predictions 214 being greater than the confidence level of the preliminary destination prediction 212 indicates that, if the caller 104 provides information that can be used to fill in a value for the currently-empty field, the confidence level 208 of the destination prediction 202 that would be generated by the claim router 114 based on such information would be greater than the confidence level 208 of the destination prediction 202 the claim router 114 would generate based on current information in the loss report 112.

Accordingly, at block 312, the dialogue advisor 110 can cause the claim loss reporting tool 108 to display a suggested that the representative ask a question that may prompt the caller 104 to provide a value for the currently-empty field to the representative 106. In some examples, the dialogue advisor 112 may provide a suggested question at block 312, such as be a pre-written question associated with the currently-empty field. In other examples, the dialogue advisor 110 may prompt the claim loss reporting tool 108 to display or highlight a name or other identifier of the currently-empty field, and the representative 106 can formulate his or her own question that prompts the caller 104 to provide a value for the identified currently-empty field. At block 312, the dialogue advisor 110 can also, or alternately, prompt the claim loss reporting tool 108 to display UI elements by which the representative 106 can enter a value for the currently-empty field, display another type of request that asks the representative 106 use his or her own words to ask the caller 104 about information associated with the currently-empty field, and/or otherwise prompt the representative 106 to fill in a value for the currently-empty field.

However, if the dialogue advisor 110 determines at block 310 that the confidence levels of one or more theoretical destination predictions 214 are the same or lower than the confidence level of the preliminary destination prediction 212 (Block 310—No), the dialogue advisor 110 may determine that the currently-empty field is not relevant to the claim 118 or the type of loss experienced by the caller 104, and/or or that obtaining a value for the currently-empty field of the loss report 112 from the caller 104 would not help the claim router 114 determine the most suitable destination for the claim 118. Accordingly, in this situation, the dialogue advisor 110 may determine not to prompt the claim loss reporting tool 108 to display any suggestions for the representative 106 related to the currently-empty field of the loss report 112 at block 314, and the currently-empty field may remain empty.

In some examples, the dialogue advisor 110 may repeat the steps of FIG. 3 for any and/or all empty fields of the loss report 112. For example, the dialogue advisor 110 may determine that a first set of currently-empty fields should be filled in because values for those fields increase the confidence levels of simulated destination predictions 210 relative to the confidence level of the preliminary destination prediction 212. The dialogue advisor 110 may accordingly prompt the claim loss reporting tool 108 to recommend asking questions about the first set of currently-empty fields at block 312. However, the dialogue advisor 110 may also determine that a second set of currently-empty fields can remain empty, because values for those fields do not increase the confidence levels of simulated destination predictions 210 relative to the confidence level of the preliminary destination prediction 212. Accordingly, at block 314, the dialogue advisor 110 may not prompt the claim loss reporting tool 108 to recommend asking questions about the second set of currently-empty fields.

As a non-limiting example of the process of FIG. 3, information entered into a loss report 112 during a communication session may allow the dialogue advisor 110, or claim router 114, to generate a preliminary destination prediction with a confidence level of 70% at block 302. The dialogue advisor 110 may identify a currently-empty field of the loss report 112 at block 304, and determine that the field is a binary field that accepts a "yes" or "no" value at block 306. At block 308, the dialogue advisor 110 can generate, or cause the claim router 114 to generate, a first theoretical destination prediction based on the current loss report 112 plus a "yes" value in the currently-empty field, and a second theoretical prediction based on the current loss report 112 plus a "no" value in the currently-empty field. In this example, if the confidence level of the first theoretical destination prediction is 75% and the confidence level of the first theoretical destination prediction is 85%, the dialogue advisor 110 can determine at block 310 that asking a question to obtain a value for the currently-empty field would increase the confidence level 208 of the destination prediction 202 the claim router 114 would generate, relative to the 70% confidence level of the current preliminary destination prediction, regardless of whether the caller 104 answers yes or no to the question.

The dialogue advisor 110 can accordingly move to block 312 to prompt the claim loss reporting tool 108 to notify the representative 106 to obtain a value for the currently-empty field, such as by displaying a text notification or other UI element indicating that the representative 106 should ask one or more questions about the currently-empty field, suggest one or more specific questions about the currently-empty field that the representative 106 should ask, change the now-empty field from an optional field to a mandatory field, and/or otherwise prompt the representative 106 to obtain and/or enter a value for the currently-empty field.

In some examples, the dialogue advisor 110 may determine that a certain question or type of question should be asked by the representative 106 if a confidence level of the preliminary destination prediction 212 is within a predefined range. For example, information entered so far into the loss report 112 may include information that is commonly present in information about comparative negligence claims, but that information may not yet be sufficient to determine with a high confidence level that a destination that specializes in comparative negligence issues is the most suitable destination for the corresponding claim 118. Instead, the preliminary destination prediction 212 may have a confidence level within a middle range of 50% to 70% that the destination that specializes in comparative negligence issues is most suitable for the corresponding claim 118. In this situation, the dialogue advisor 110 may cause the claim loss reporting tool 108 to ask a question that is specifically designed to lead to an answer that would move the confidence level, about the comparative negligence destination being the most suitable destination, to above 70% or to below 50%. This specialized question can accordingly assist the claim intake system 102 in determining whether comparative negligence issues are really involved in the claim 118, and thus whether the comparative negligence destination is really the most suitable destination for the claim 118. However, if the initial confidence level of the preliminary destination prediction 212 was already above or below the middle range, the dialogue advisor 110 may determine that the specialized question should not be asked because the preliminary destination prediction 212 already had a sufficient confidence level with respect to whether the comparative negligence destination is the most suitable destination for the claim 118.

In some examples, the dialogue advisor 110 may additionally, or alternately, suggest one or more actions that the representative 106 should take during the communication session with the caller 104, as discussed below with respect to FIG. 4. As an example, if data entered into the loss report 112 causes the dialogue advisor 110 or the claim router 114 to generate a simulated destination prediction with a confidence level above a predefined confidence threshold, the dialogue advisor 110 can determine that the associated claim 118 is likely to ultimately be routed to the destination identified by the destination identifier of that simulated destination prediction. The dialogue advisor 110 can determine actions that are commonly performed when claims are routed to that destination, and cause the claim loss reporting tool 108 to prompt the representative 106 to perform that action during the communication session and before the claim 118 is later routed to the destination.

Figure 4:
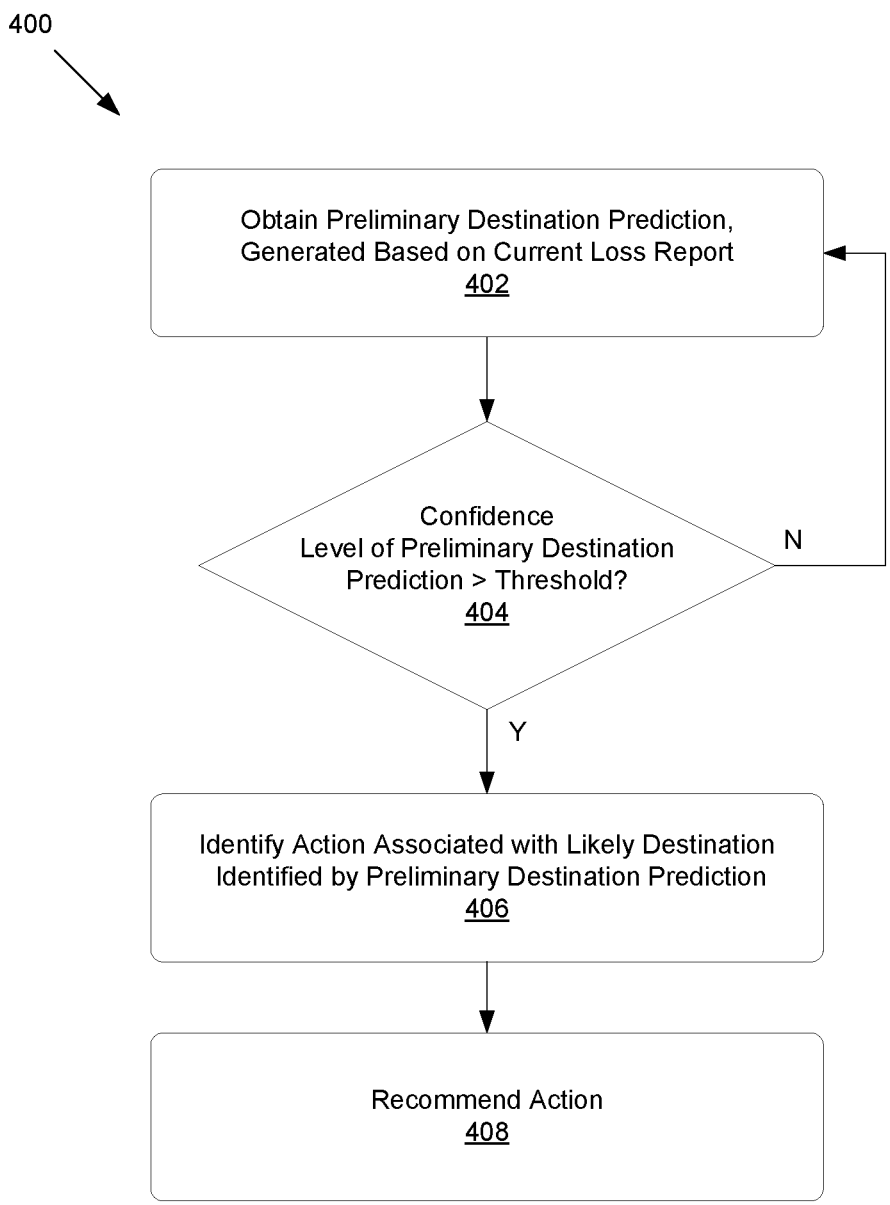
FIG. 4 shows a flow chart of a process by which the dialogue advisor can determine whether to recommend an action to a representative via a claim loss reporting tool.

FIG. 4 shows a flow chart of a process 400 by which the dialogue advisor 110 can determine whether to recommend an action to the representative 106 via the claim loss reporting tool 108. During process 500, the dialogue advisor 110 can be executed by at least one computing system, such as the computing device described below with respect to FIG. 7.

At block 402, the dialogue advisor 110 can obtain the preliminary destination prediction 212 based on current information in the loss report 112. In some examples, the dialogue advisor 110 can itself generate the preliminary destination prediction 212 using the second machine learning model 216. As discussed above, the second machine learning model 216 can be a copy of the first machine learning model 206 used by the claim router 114, such that the preliminary destination prediction 212 substantially matches the destination prediction 202 that the claim router 114 would produce based on the current information in the loss report 112. In other examples, the dialogue advisor 110 can access a draft destination prediction 202 generated by the claim router 114 based on the current information in the loss report 112, and use the draft destination prediction as the preliminary destination prediction 212.

At block 404, the dialogue advisor 110 can determine whether the confidence level of the preliminary destination prediction 212 is above a predefined threshold. For example, the predefined threshold can be set to 75% of any other threshold value, and if the preliminary destination prediction 212 has a confidence level of 75% or above, the dialogue advisor 110 can determine that it is likely that the associated claim 118 will ultimately be routed by the claim router 114 to the destination identified by the destination identifier of the preliminary destination prediction 212. If the confidence level of the preliminary destination prediction 212 is not above the predefined threshold (Block 404—No), the dialogue advisor 110 can return to block 402 and obtain a subsequent preliminary destination prediction 212 generated after additional data has been added to the loss report 112. However, if the confidence level of the preliminary destination prediction 212 is above the predefined threshold (Block 404—Yes), the dialogue advisor 110 can move to block 406.

At block 406, the dialogue advisor 110 can identify an action associated with the likely destination for the claim 118, as identified by the destination identifier of the preliminary destination prediction 212. For example, the likely destination may be associated with a particular action, such as obtaining a recorded statement from the caller 104 or obtaining one or more documents from the caller 104.

At block 408, the dialogue advisor 110 can prompt the claim loss reporting tool 108 to display a suggestion associated with the identified action to the representative 106, such that the action can be performed during the current on-going communication session with the caller 104. In some examples, performing the identified action during the current communication session as recommended at block 408 can improve efficiency and/or avoid delays, relative to waiting for a worker associated with the destination to perform the identified action at a later point in time after the current communication session has ended.

As a non-limiting example of the process of FIG. 4, at block 402 the dialogue advisor 110 or claim router 114 may generate the preliminary destination prediction 212 during the communication session between the representative 106 and the caller 104. The preliminary destination prediction 212 can indicate, with a confidence level above a predefined threshold, that the associated claim 118 is likely to be ultimately routed by the claim router 114 to a particular department in the insurance company. At block 406, the dialogue advisor 110 can determine that the particular department, identified in the preliminary destination prediction 212 routinely, or with at least a threshold frequency, processes claims based in part on recorded statements provided by callers. Accordingly, to avoid delays that would be caused by ending the current communication session with the caller 104, routing the claim 118 to that particular department, and then having a worker in that particular department attempt to contact the caller 104 again to obtain the caller's recorded statement, at block 408 the dialogue advisor 110 can instruct the claim loss reporting tool 108 to prompt the representative 106 who is already currently speaking with the caller 104 to obtain the caller's recorded statement. As such, the caller's statement can be obtained more quickly and/or more efficiently than if attempts are made to obtain the recorded statement after the loss report 112 has been finalized and the claim 118 has already been routed to the destination.

In other examples, the dialogue advisor 110 may determine other types of actions that should be performed by the representative 106 during the communication session. For instance, if a simulated destination prediction is made that indicates, with a relatively high confidence level, that the claim 118 is likely to be routed to a department or team that routinely uses a certain type of caller-provided document when handling similar claims, the dialogue advisor 110 can cause the claim loss reporting tool 108 to prompt the representative 106 to obtain, or at least request, that type of document from the caller 104 during the current communication session. This can, for example, allow the document to be obtained more quickly and/or more efficiently than having another department later request the document from the caller 104 after the claim 118 has been routed to that department. As another example, the dialogue advisor 110 can cause the claim loss reporting tool 108 to prompt the representative 106 to, during the call with the caller 104, order a police report associated with the loss, and/or work with the caller 104 to order such a police report. As still another example, the dialogue advisor 110 can cause the claim loss reporting tool 108 to prompt the representative 106 take actions specific to a certain jurisdiction associated with a loss and/or present other jurisdiction-specific guidance to the representative 106.

In some examples, the dialogue advisor 110 may suggest a certain action that may otherwise be performed by a worker associated with the likely destination for the claim 118. Such a worker may have more experience with the suggested action than the representative 106. Accordingly, the representative 106 may, during the current communication session with the caller 104, connect the caller 104 with the worker so that the worker can perform the suggested action instead of the representative 106. In some examples, the representative 106 may perform a "warm transfer" to conference the worker in to the current communication session with the caller 104, while the representative 106 also remains on the line. Accordingly, the worker can perform the suggested action during the current communication session that is already in progress, instead of attempting to contact the caller 104 again at a later point in time to perform the suggested action.

As an example, if the dialogue advisor 110 determines that the claim 118 will likely be routed to a particular claim handling department that routinely processes claims based on recorded statements from callers, the dialogue advisor 110 can cause the claim loss reporting tool 108 to notify the representative 106 that a recorded statement should be obtained during the current communication session with the caller 104. The representative 106 can accordingly perform a warm transfer to conference a claim handler, from the particular claim handling department, into the current call with the caller 104. The representative 106 may remain on the line with the caller 104 during the warm transfer, but may introduce the claim handler to the caller 104 and allow the claim handler to take the caller's recorded statement. Thereafter, the communication session can continue between the caller 104 and the original representative 106 if more information is to be obtained for the loss report 112.

In some examples, the dialogue advisor 110 may also, or alternately, review information currently in the loss report 112, and identify conflicting information within different fields. For example, a "time of loss" field may have information indicating that an accident occurred at 10 PM. However, a "description of loss" field may include a text description noting that the caller 104 stated that the sun was in his or her eyes at the time of the accident. Because the sun would not be out at 10 PM, the current information about the time of loss may conflict with the loss description. The dialogue advisor 110 may, based on detection of the conflict, cause the claim loss reporting tool 108 to prompt the representative 106 to ask follow-up questions about the time of loss. For instance, the caller 104 may indicate that the time of loss was really l0AM, and thus the information in the "time of loss" field can be corrected in the loss report 112. In some examples, conflicting information in the loss report 112 may lead to a lower confidence level in a generated destination prediction than if the correct information had been entered into the loss report 112. Detection of such conflicting information during the communication session with the caller 104 can thus lead to an increase in the confidence level of a generated destination prediction.

Overall, the systems and methods describe herein can allow the dialogue advisor 110 to dynamically suggest questions to be asked during the communication session with the caller 104, rather than determining questions based on a predefined and static logic tree. The dialogue advisor 110 can suggest questions based on identifying data that, if added to the current information in the loss report 112, is likely to improve the confidence level 208 of the destination prediction 202 ultimately made by the claim router 114. Accordingly, the dialogue advisor 110 can result in claims being routed more often to an optimal destination, and thereby reduce the number of downstream reassignments of claims between destinations 116 that might otherwise prolong claim processing times, increase bandwidth usage to transfer claim data between destinations, and/or otherwise increase usage of computing resources. The dialogue advisor 110 can also identify actions that can be taken proactively during the initial communication session with the caller 104, to avoid attempting to set up a later communication session with the caller 104 to perform that action. Performing such actions during the initial communication session can also reduce overall claim processing times, and/or reduce network usage and usage of other computing resources that would otherwise be associated with attempting to engage in subsequent communication sessions with callers.

In some examples, after the claim 118 has been routed to a selected destination, the claim intake system 102 or the claim router 114 can evaluate actual results associated with how the destination processed the claim 118. For example, the claim router 114 can determine if the selected destination processed the claim 118 and met operational goals or performance targets, or if the claim 118 was ultimately transferred to a different destination 116 or was processed at the selected destination without meeting operational goals or performance targets. The claim router 114 can thus determine whether its destination prediction 202 was "correct," and adjust weights of the first machine learning model 206 according to such new feedback, and/or adjust confidence levels of corresponding destination predictions made going forward. Additional feedback for further training the first machine learning model 206 can include indications of whether performing actions suggested to the representative 106 during the communication session successfully reduced the need to perform such actions at destinations 116, whether questions suggested to the representative 106 during the communication session successfully improved the confidence levels of destination predictions, or whether any other element described herein succeeded in reducing claim processing cycle times, reduced follow-up attempts with callers, optimized selection of destinations 116, and/or optimized any other target or goal. If the first machine learning model 206 is retrained based on such data, a copy of the first machine learning model 206, or indications of the changes to the first machine learning model 206 can be provided to the dialogue advisor 110 so that the second machine learning model 216 can be changed to be consistent with the first machine learning model 206.

FIG. 5 shows an example UI 500 for the claim loss reporting tool 108. The UI 500 of the claim loss reporting tool 108 can include various tabs 502 and/or sections that include UI elements 504 that allow the representative 106 to enter information for the loss report 112. As noted above, the loss report 112 may have many fields. However, the UI 500 of the claim loss reporting tool 108 may only surface or present UI elements 504 associated with subset of the total fields within the loss report 112. For example, the claim loss reporting tool 108 may avoid displaying UI elements 504 associated with a field of the loss report 112 that is only relevant to a specific type of claim or loss scenario, unless the loss report 112 is associated with that specific type of claim or loss scenario.

Some tabs 502 or sections may be related to types of information that may be likely to apply to any claim of a certain type. For example, for an automobile insurance claim, the UI 500 may include a first tab with UI elements 504 for entering initial information about an automobile accident, a second tab with UI elements 504 for entering other details about the loss, and a third tab with UI elements 504 for entering information about vehicles and participants. The UI 500 may also have a tab, such as an insights tab 506 as shown in FIG. 5, that can present UI elements 504 associated with questions and/or actions suggested by the dialogue advisor 110. For example, if the dialogue advisor 110 determines that the representative 106 should attempt to obtain a value for a certain currently-empty field of the loss report 112, as described above with respect to FIG. 3, the claim loss reporting tool 108 may display corresponding UI elements 504 in the insights tab 506.

The UI 500 may also have a notifications section 508. The notifications section 508 can display notifications and/or other information about tabs 502 or other sections of the UI 500. For example, as shown in FIG. 5, the notifications section 508 can display status icons 510 for the initial information tab, the loss details tab, the vehicles and participants tab, and the insights tab 506. The status icons 510 can indicate whether any required or optional information is still to be collected with respect to corresponding tabs 502. In some examples, a status icon may be a check mark if all required information has been collected with respect to a tab, may be an exclamation point if optional, but recommended, information has not yet been collected with respect to a tab, and/or may be a circle-backslash symbol if required information has not yet been collected with respect to a tab. In other examples, other types of symbols or indicators can be used as the status icons 510.

The notifications section 508 may also display a text description, or other information, about optional or required information that has not yet been received. For example, an "insights" portion of the notifications section 508 may correspond to the insights tab 506 to present information about actions and/or questions suggested by the dialogue advisor 110, and can include text-based instructions for the representative 106 about types of information to be collected within the corresponding insights tab 506.

The UI 500 may further have a submit button 512 and/or other controls. The submit button 512 may, for example, allow the representative 106 to submit the loss report 112 generated using information entered into the claim loss reporting tool 108. After the loss report 112 has been submitted, the claim router 114 can determine a destination, out the set of possible destinations 116, for the associated claim 118, as described herein.

The UI 500 may update during the communication session between the caller 104 and the representative 106. For example, as the representative 106 enters information into the loss report 112 via UI elements 504 in the tabs 502, the dialogue advisor 110 may generate simulated destination predictions 210 based on the information currently in the loss report 112, as discussed above with respect to FIG. 2. For instance, the dialogue advisor 110 may generate the preliminary destination prediction 212 based on the information currently in the loss report 112, and generate one or more theoretical destination predictions 214 based on the information currently in the loss report 112 plus possible additional information that could be added to one or more currently-empty fields of the loss report 112. If confidence levels of the theoretical destination predictions 214 are greater than the confidence level of the preliminary destination prediction 212, because the theoretical destination predictions 214 are based in part on a currently-empty field being filled with a potential value and the preliminary destination prediction 212 is based in part on the currently-empty field being empty, the dialogue advisor 110 may cause an update of the UI 500 of the claim loss reporting tool 108. For example, the dialogue advisor 110 may cause the UI 500 to update and display information in the insight tab 506 and/or notifications section 508 that prompt the representative 104 to obtain data from the caller 104 to fill in the currently-empty field of the loss report 112. This process is described further below with respect to FIG. 6.

Figure 6:
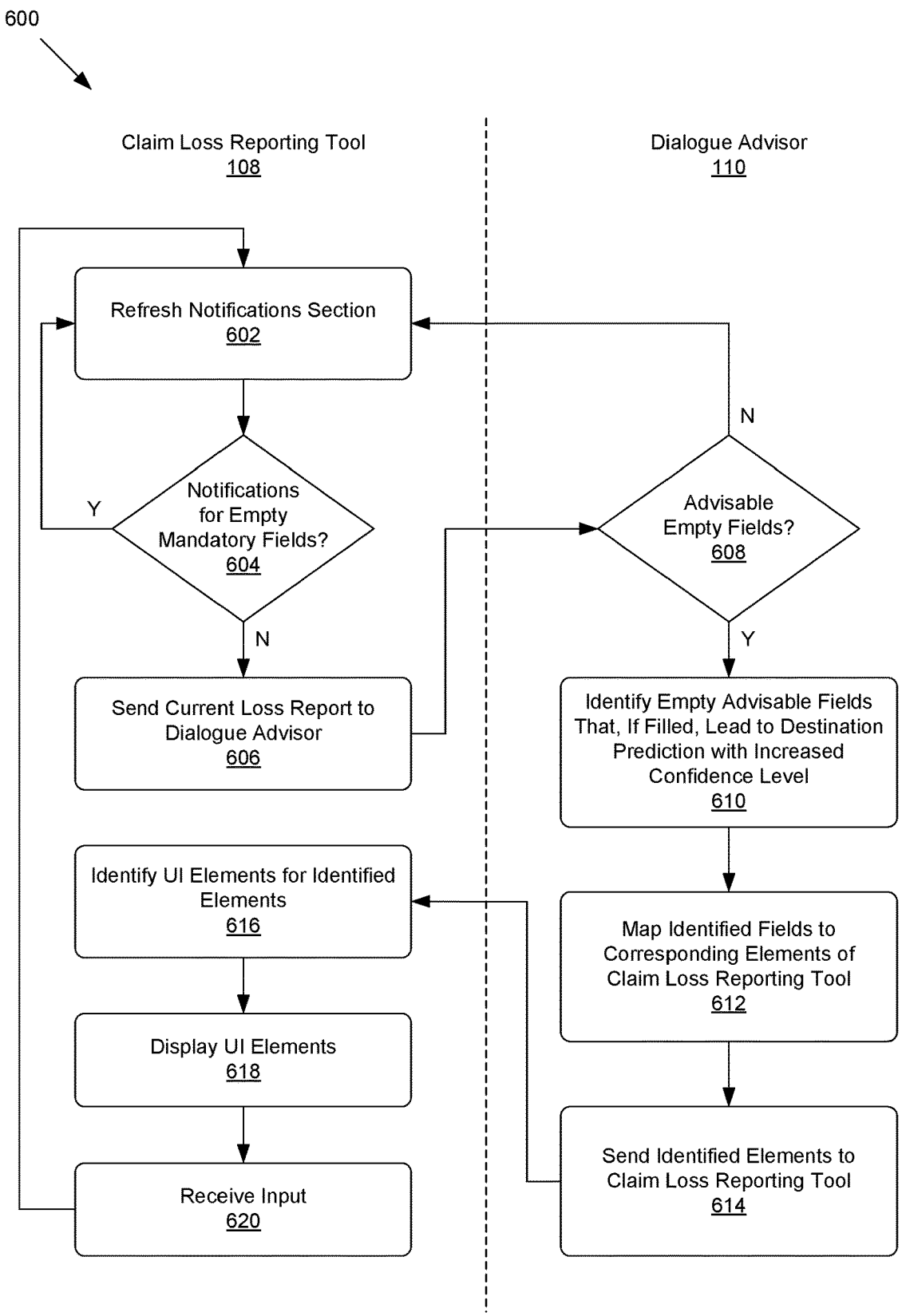
FIG. 6 shows a flowchart of a process in which a claim loss reporting tool and a dialogue advisor interact during a communication session between a caller and a representative.

FIG. 6 shows a flowchart of a process 600 in which the claim loss reporting tool 108 and the dialogue advisor 110 interact during the communication session between the caller 104 and the representative 106. During process 600, the claim loss reporting tool 108 and the dialogue advisor 110 can be executed by at least one computing system, such as the computing device described below with respect to FIG. 7.

At block 602, the claim loss reporting tool 108 can refresh the notifications section 508 of the UI 500, based on information entered into the loss report 112 so far during the communication session. In some examples, the claim loss reporting tool 108 can be configured to refresh the notifications 508 section every second, or at any other interval. In other examples, the claim loss reporting tool 108 can be configured to refresh the notifications 508 section each time new information is entered into the loss report 112 by the representative 104 via UI elements 504 of the UI 500.

At block 604, the claim loss reporting tool 108 can determine if the notifications section 508 indicates that information for any currently-mandatory fields of the loss report 112 has not yet been received. If information is still to be obtained for mandatory fields of the loss report 112 (Block 604—Yes), the process can return to block 602 and the representative 106 can continue entering details about the loss to fill in the mandatory fields of the loss report 112. Once all of the mandatory fields of the loss report 112 have been filled in, and the notifications section 508 does not indicate that information for any of the mandatory fields of the loss report 112 is still to be received (Block 604—No), the claim loss reporting tool 108 can move to block 606. At block 606, the claim loss reporting tool can send the loss report 112, containing the information entered so far during the communication session, to the dialogue advisor 110. In some examples, blocks 602 and/or 604 can be absent, such that the claim loss reporting tool 108 sends current data in the loss report 112 to the dialogue advisor 110 at block 606, even if some mandatory fields of the loss report 112 have not yet been filled in.

At block 608, the dialogue advisor 110 can determine if any advisable fields of the loss report 112 are empty, based on information about the current loss report 112 provided by the claim loss reporting tool 108 at block 606. An advisable field can correspond with a data element or feature that has been given a corresponding weight in the first machine learning model 206 and/or second machine learning model 216, or is otherwise relevant to a question or action that can be suggested by the dialogue advisor 110. If no advisable fields are empty (Block 608—No), the process can end, or the process can return to block 602. However, if at least one advisable field is empty (Block 608—Yes), the dialogue advisor 110 can move to block 610.

At block 610, the dialogue advisor 110 can identify empty advisable fields that, if filled, would lead to an increase in the confidence level 208 of the destination prediction 202 that would be made by the claim router 114. For example, the dialogue advisor 110 can use the process 300 shown in FIG. 3 to test out one or more possible values for an empty advisable field, and determine if entry of such possible values would lead to generation of theoretical destination predictions 214 that have higher confidence levels than the preliminary destination prediction 212 that can be made based only on the current information in the loss report 112. In some examples, at block 610 the dialogue advisor 110 may also use the process of FIG. 4 to determine if the preliminary destination prediction 212 has a confidence level higher than a threshold, and accordingly determine an action associated with a likely destination for the associated claim 118. In some examples, at block 610 the dialogue advisor 100 may also identify any advisable fields that are not empty, but that contain conflicting information.

At block 612, the dialogue advisor 110 can map fields or actions, identified at block 610, to corresponding elements of the claim loss reporting tool 108. For example, the dialogue advisor 110 can determine a text string for a new question associated with an identified empty advisable field, which can be an element used within the claim loss reporting tool 108. At block 614, the dialogue advisor 110 can send the elements mapped at block 612 to the claim loss reporting tool 108.

At block 616, the claim loss reporting tool 108 can identify UI elements 504 that correspond to the elements identified by the dialogue advisor 110. For example, if the dialogue advisor 110 determined that a question should be asked about a certain empty advisable field and/or provided a text string for that question, the claim loss reporting tool 108 can identify a dialogue box, check box, text entry field, or other UI element 504 that would enable the representative 106 to enter information associated with the currently-empty advisable field.

At block 618, the claim loss reporting tool 108 can display the UI elements 504 in the UI 500, and/or display corresponding notifications in the notifications section 508 of the UI 500, based at least in part on the information received from the dialogue advisor 110. For example, the claim loss reporting tool 108 may display UI elements 504 associated with the empty advisable fields identified by the dialogue advisor 110 at block 610, indications in the insight tab 506 or the notifications section 508 of suggested questions or the corresponding empty advisable fields, and/or indications of suggested actions associated with the predicted likely destination for the claim 118.

The claim loss reporting tool 108 can also receive user input associated with the UI elements 504 at block 620, such as input to fill in a currently-empty advisable field. The process can then end or loop back to block 602 to evaluate the information in the loss report 112 again using the additional information received at block 620.

The process 600 can be used to update the UI 500 of the claim loss reporting tool 108 in real-time, or near real-time, during the communication session. Accordingly, the UI 500 can be dynamically updated during the communication session to prompt the representative 106 to obtain specific types of additional information from the caller 104 that may lead to an increase in the confidence level 508 of the destination prediction 202 that will later be generated by the claim router 114. Dynamically identifying which types of additional information are relevant to the claim 118 and may increase the confidence level 508 of the destination prediction 202 can allow the representative 106 to obtain that information during the communication session while still in contact with the caller 104. Because, the claim router 114 can therefore operate on more relevant information and generate a higher-confidence destination prediction, the claim 118 can be routed initially to a destination that is more likely to be suited to process the claim 118, and thereby reduce the chances of the claim 118 being reassigned to a different destination downstream. Such a reduction in downstream reassignments can reduce network bandwidth usage associated with transferring claim data between destinations, and similarly reduce the amount of processing cycles, memory usage, and/or other computing resources that may be used if multiple destinations attempted to process the same claim.

Figure 7:
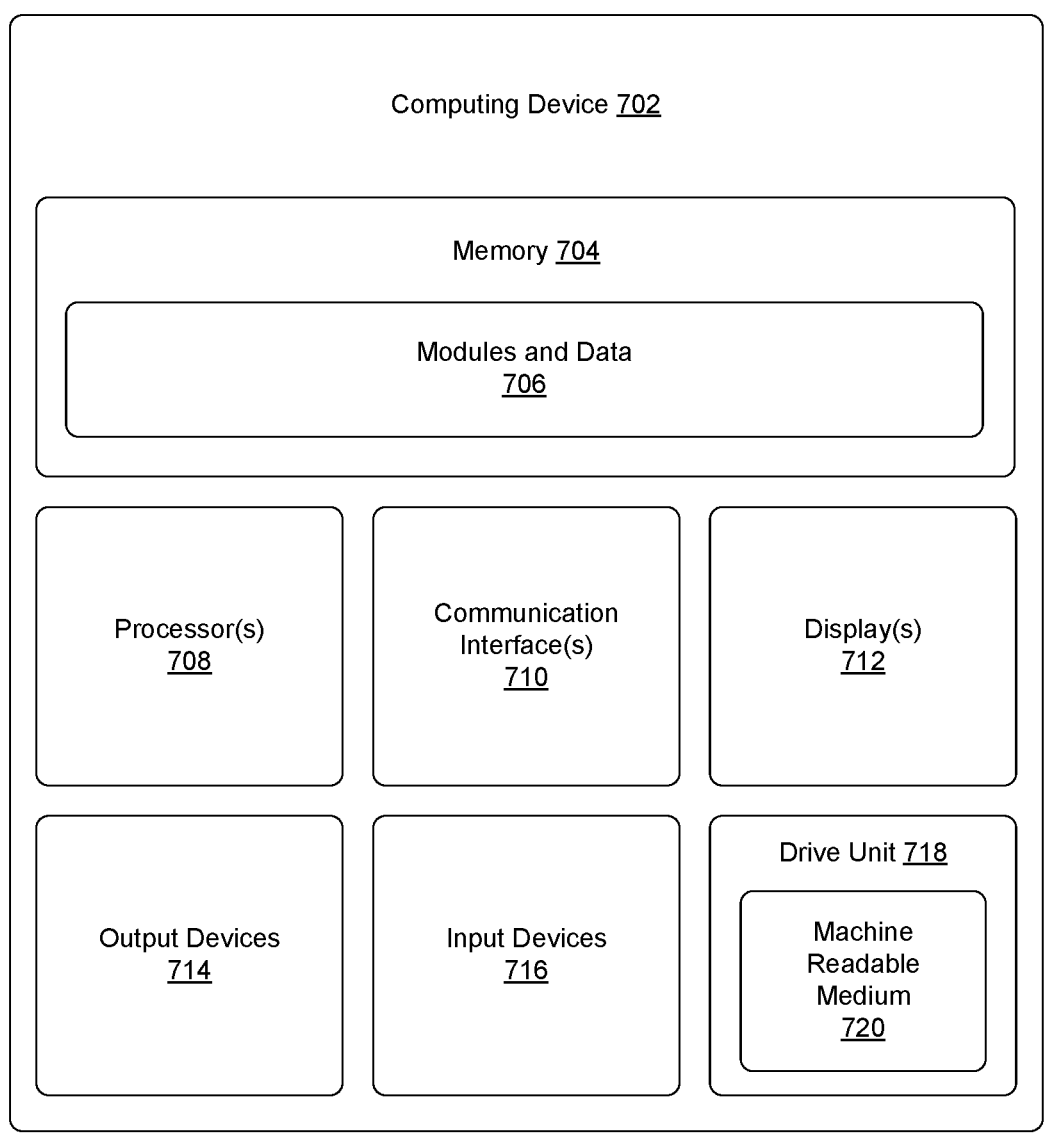
FIG. 7 shows an example system architecture for a computing device associated with a claim intake system.

FIG. 7 shows an example system architecture 700 for a computing device 702 associated with the claim intake system 102 described herein. A computing device 702 can be a server, computer, or other type of computing device that executes one or more portions of the claim intake system 102, such as the claim loss reporting tool 108, the dialogue advisor 110, and/or the claim router 114. In some examples, elements of the claim intake system 102 can be distributed among, and/or be executed by, multiple computing devices 702. For example, the claim router 114 may execute on a different computing device 702 than the claim loss reporting tool 108 and/or the dialogue advisor 110. In some examples, the communication device 120 or the terminal 122 can also be a computing device as shown in FIG. 7.

The computing device 702 can include memory 704. In various examples, the memory 704 can include system memory, which may be volatile (such as RAM), non-volatile (such as ROM, flash memory, etc.) or some combination of the two. The memory 704 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store desired information and which can be accessed by the computing device 702. Any such non-transitory computer-readable media may be part of the computing device 702.

The memory 704 can store modules and data 706. The modules and data 706 can include one or more of the claim loss reporting tool 108, the dialogue advisor 110, the loss report 112, the claim router 114, other data about the claim 118, data about the destinations 116, the destination prediction 202, the simulated destination predictions 210, the first machine learning model 206, the second machine learning model 216, and/or other elements described herein. Additionally, or alternately, the modules and data 706 can include any other modules and/or data that can be utilized by the claim intake system 102 to perform or enable performing any action taken by the claim intake system 102. Such other modules and data can include a platform, operating system, and applications, and data utilized by the platform, operating system, and applications.

One or more computing devices 702 of the claim intake system 102 can also have processor(s) 708, communication interfaces 710, displays 712, output devices 714, input devices 716, and/or a drive unit 718 including a machine readable medium 720.

In various examples, the processor(s) 708 can be a central processing unit (CPU), a graphics processing unit (GPU), both a CPU and a GPU, or any other type of processing unit. Each of the one or more processor(s) 708 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 708 may also be responsible for executing computer applications stored in the memory 704, which can be associated with common types of volatile (RAM) and/or nonvolatile (ROM) memory.

The communication interfaces 710 can include transceivers, modems, interfaces, antennas, telephone connections, and/or other components that can transmit and/or receive data over networks, telephone lines, or other connections.

The display 712 can be a liquid crystal display or any other type of display commonly used in computing devices. For example, a display 712 may be a touch-sensitive display screen, and can then also act as an input device or keypad, such as for providing a soft-key keyboard, navigation buttons, or any other type of input.

The output devices 714 can include any sort of output devices known in the art, such as a display 712, speakers, a vibrating mechanism, and/or a tactile feedback mechanism. Output devices 714 can also include ports for one or more peripheral devices, such as headphones, peripheral speakers, and/or a peripheral display.

The input devices 716 can include any sort of input devices known in the art. For example, input devices 716 can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

The machine readable medium 720 can store one or more sets of instructions, such as software or firmware, that embodies any one or more of the methodologies or functions described herein. The instructions can also reside, completely or at least partially, within the memory 704, processor(s) 708, and/or communication interface(s) 710 during execution thereof by the one or more computing devices 702 of the claim intake system 102. The memory 704 and the processor(s) 708 also can constitute machine readable media 720.

As discussed above, conventional claim loss reporting tools may suggest questions to representatives based on a static logic trees or pre-written scripts. However, such conventional claim loss reporting tools may not be capable of dynamically suggesting questions based on the actual information that has been received so far during a communication session with a caller. Such existing claim loss reporting tools also do not suggest questions based on predictions of which destination an associated insurance claim will be routed to for later processing. For example, conventional claim loss reporting tools may not identify deficiencies within the information received so far during a communication session that, if addressed during the communication session, could increase the confidence level of a destination prediction made by a claim router.

For example, existing claim loss reporting tools may follow static logic trees to suggest questions so that certain information is received from a caller and entered into a loss report. However, if such predefined questions do not lead to sufficient information being entered into the loss report, as described above, a predictive claim routing system may route an associated insurance claim to a less than optimal destination. For instance, it may have been possible to ask the caller a certain question that would lead to, in the caller's answer, information that would improve a confidence level of a prediction that would later be made by the claim routing system about where to route the insurance claim. However, if the static logic trees used by many claim loss reporting tools are not configured to include that question, the information from a corresponding answer would not be available to a predictive claim routing system, and the claim routing system may accordingly make a prediction with a lower confidence level.

Additionally, in some existing systems, after a loss report is taken during an initial communication with a caller, the associated claim is then routed to a particular department or claim handler for further processing. However, if that claim department or claim handler needs to perform an action that involves the caller, such as to take the caller's recorded statement about an accident or to obtain a certain document from the caller, the claim department or claim handler may have difficulty getting in touch with the caller to perform that action. This can lead to delays and/or inefficiencies, relative to if the action had been performed during the initial communication session with the caller when the loss report was taken.

However, the dialogue advisor 110 described herein can dynamically determine what types of additional information could be obtained from the caller during a current communication session, and determine which of those types of additional information, if obtained, would lead to an increase in the confidence level of the destination prediction that will later be made by the claim router 114. Accordingly, the dialogue advisor 110 can dynamically cause the claim loss reporting tool 108 to prompt the representative 106 to ask the caller 104 questions to obtain those types of additional information during the current communication session, before the claim 118 is routed to a selected destination. Accordingly, the dialogue advisor 110 can cause the loss report 118 to include more relevant information that increases the confidence level 208 of the destination prediction 202 later made by the claim router 114, and thereby decrease the likelihood of downstream reassignments of the claim 118 between destinations 118, reduce overall usage of computing resources associated with different destinations 118, reduce usage of network bandwidth to transmit claim data between different destinations 118, and lower claim processing times overall.

Moreover, the dialogue advisor 110 can use one or more simulated destination predictions 210 to determine a likely destination for the claim 118 during the current communication session, before the claim 118 is routed to a selected destination, and prompt the representative 106 to perform one or more actions that otherwise would be performed later by a worker associated with the likely destination. By performing the actions during the communication session, instead of waiting until after claim 118 has been assigned to a destination and then attempting to re-contact the caller 104, the systems and methods described herein can reduce overall usage of computing resources associated with a destination attempting to contact the caller 104 again and/or performing the actions, reduce usage of network bandwidth to transmit messages during later attempts to contact the caller 104 again, and lower claim processing times overall.

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A computer-implemented method, comprising:
   generating, by one or more processors, and based on input provided via a claim loss reporting tool during a communication session associated with an insurance claim, a loss report associated with the insurance claim;
   generating, by the one or more processors, and during the communication session, a preliminary destination prediction of a destination, selected from a set of possible destinations, for claim data associated with the insurance claim, wherein:
     the preliminary destination prediction is generated, by a dialogue advisor machine learning model associated with the claim loss reporting tool, based on current information in the loss report,
     the dialogue advisor machine learning model is an instance of a machine learning model that a claim router, different from the claim loss reporting tool, is configured to use following completion of the communication session to generate a final destination prediction indicating the destination for the claim data, and
     the preliminary destination prediction, generated based on the current information, is associated with a first confidence level;
   identifying, by the one or more processors, and during the communication session, an empty field in the loss report based on the current information;
   determining, by the one or more processors, and during the communication session, a set of possible values for the empty field;
   generating, by the one or more processors, during the communication session, and using the dialogue advisor machine learning model, one or more theoretical destination predictions that:
     have second confidence levels, and
     are based on the current information in the loss report in combination with individual values, of the set of possible values, for the empty field;
   determining, by the one or more processors, and during the communication session, that the second confidence levels of the one or more theoretical destination predictions are greater than the first confidence level of the preliminary destination prediction;
   determining, by the one or more processors, during the communication session, and based on determining that the second confidence levels are greater than the first confidence level, that filling the empty field with a value would increase a confidence level of the final destination prediction generated by the claim router following the completion of the communication session; and
   causing, by the one or more processors, and based on determining that filling the empty field would increase the confidence level of the final destination prediction, a user interface of the claim loss reporting tool to display, during the communication session, at least one user interface element that requests that the empty field be filled,
   wherein the machine learning model is trained, based on a training data set associated with assignments of previous insurance claims to destinations based on corresponding loss reports, to identify features that are predictive of the destinations that processed the previous insurance claims.

2. The computer-implemented method of claim 1, wherein the at least one user interface element comprises suggested text of a question associated with the empty field.

3. The computer-implemented method of claim 1, further comprising:
   receiving, by the one or more processors, and based on second input provided via the claim loss reporting tool, the value for the empty field;
   adjusting, by the one or more processors, the loss report based on the value;

generating, by the one or more processors, and via the claim router using the machine learning model based on the loss report, the final destination prediction indicating the destination for the claim data;

selecting, by the one or more processors, the destination for the claim data based on the final destination prediction; and routing, by the one or more processors, the claim data to the destination.

4. The computer-implemented method of claim 1, wherein the set of possible destinations includes a plurality of groups of one or more workers available to process the claim data within an insurance company.

5. The computer-implemented method of claim 1, wherein the at least one user interface element comprises a notification associated with the empty field.

6. The computer-implemented method of claim 1, further comprising:
receiving, by the one or more processors, additional data indicating downstream impacts of displaying, via the user interface of the claim loss reporting tool, particular user interface elements that request that corresponding empty fields of the loss report be filled, during previous communication sessions; and
re-training, by the one or more processors, the machine learning model based on the additional data.

7. The computer-implemented method of claim 1, further comprising:
determining, by the one or more processors, and during the communication session, that the first confidence level of the preliminary destination prediction is above a threshold;
identifying, by the one or more processors, during the communication session, and based on determining that the first confidence level is above the threshold, an action associated with the destination indicated by the preliminary destination prediction; and
causing, by the one or more processors, the user interface of the claim loss reporting tool to display at least one second user interface element instructing a user of the claim loss reporting tool to perform the action during the communication session.

8. One or more computing devices, comprising:
at least one processor; and
memory storing computer-executable instructions associated with a claim loss reporting tool that, when executed by the at least one processor, cause the at least one processor to perform operations comprising:
generating, based on input provided via the claim loss reporting tool during a communication session associated with an insurance claim, a loss report associated with the insurance claim;
generating, during the communication session, a preliminary destination prediction of a destination, selected from a set of possible destinations, for claim data associated with the insurance claim, wherein:
the preliminary destination prediction is generated, by a dialogue advisor machine learning model associated with the claim loss reporting tool, based on current information in the loss report,
the dialogue advisor machine learning model is an instance of a machine learning model that a claim router, different from the claim loss reporting tool, is configured to use following completion of the communication session to generate a final destination prediction indicating the destination for the claim data, and
the preliminary destination prediction, generated based on the current information, is associated with a first confidence level;
identifying, during the communication session, an empty field in the loss report based on the current information;
determining, during the communication session, a set of possible values for the empty field;
generating, during the communication session, and using the dialogue advisor machine learning model, one or more theoretical destination predictions that:
have second confidence levels, and
are based on the current information in the loss report in combination individual values, of the set of possible values for the empty field;
determining, during the communication session, that the second confidence levels of the one or more theoretical destination predictions are greater than the first confidence level of the preliminary destination prediction;
determining, during the communication session, and based on determining that the second confidence levels are greater than the first confidence level, that filling the empty field with a value would increase a confidence level of the final destination prediction generated by the claim router following the completion of the communication session; and
causing, based on determining that filling the empty field would increase the confidence level of the final destination prediction, a user interface of the claim loss reporting tool to display, during the communication session, a prompt requesting that the empty field be filled,
wherein the machine learning model is trained, based on a training data set associated with assignments of previous insurance claims to destinations based on corresponding loss reports, to identify features that are predictive of the destinations that processed the previous insurance claims.

9. The one or more computing devices of claim 8, wherein the prompt comprises suggested text of a question associated with the empty field.

10. The one or more computing devices of claim 8, wherein the prompt comprises a notification associated with the empty field.

11. The one or more computing devices of claim 8, wherein the operations further comprise:
receiving, based on second input provided via the claim loss reporting tool the value for the empty field;
adjusting the loss report based on the value; and
providing the loss report to the claim router, to cause the claim router to:
generate, using the machine learning model based on the loss report, the final destination prediction indicating the destination for the claim data;
select the destination for the claim data based on the final destination prediction; and
route the claim data to the destination.

12. The one or more computing devices of claim 8, wherein the set of possible destinations includes a plurality of groups of one or more workers available to process the claim data within an insurance company.

13. A system comprising:
a claim loss reporting tool, executed by a computing device, configured to:
generate, based on input provided via the claim loss reporting tool during a communication session associated with an insurance claim, a loss report associated with the insurance claim; and
a dialogue advisor, executed by the computing device or a second computing device, that is associated with the claim loss reporting tool and is configured to:
generate, during the communication session, a preliminary destination prediction of a destination, selected from a set of possible destinations, for claim data associated with the insurance claim, wherein:
the preliminary destination prediction is generated, using a dialogue advisor machine learning model, based on current information in the loss report associated with the insurance claim,
the dialogue advisor machine learning model is an instance of a machine learning model that a claim router, different from the claim loss reporting tool and the dialogue advisor, is configured to use following completion of the communication session to generate a final destination prediction indicating the destination for the claim data, and
the preliminary destination prediction, generated based on the current information, is associated with a first confidence level;
identify, during the communication session, an empty field in the loss report based on the current information;
determine, during the communication session, a set of possible values for the empty field;
generate, during the communication session, and using the dialogue advisor machine learning model, one or more theoretical destination predictions that:
have second confidence levels, and
are based on the current information in the loss report in combination with individual values, of the set of possible values, for the empty field;
determine, during the communication session, that the second confidence levels of the one or more theoretical destination predictions are greater than the first confidence level of the preliminary destination prediction;
determine, during the communication session, and based on determining that the second confidence levels are greater than the first confidence level, that filling the empty field with a value would increase a confidence level of the final destination prediction generated by the claim router following the completion of the communication session; and
cause, based on determining that filling the empty field would increase the confidence level of the final destination prediction, a user interface of the claim loss reporting tool to display, during the communication session, a prompt requesting that the empty field be filled,
wherein the machine learning model is trained, based on a training data set associated with assignments of previous insurance claims to destinations based on corresponding loss reports, to identify features that are predictive of the destinations that processed the previous insurance claims.

14. The system of claim 13, wherein the prompt comprises suggested text of a question associated with the empty field.

15. The system of claim 13, wherein the prompt comprises a notification associated with the empty field.

16. The system of claim 13, wherein:
the claim loss reporting tool is further configured to:
receive, based on second input, the value for the empty field; and
adjust the loss report based on the value,
the system further comprises the claim router, and
the claim router is configured to:
generate, using the machine learning model based on the loss report, the final destination prediction indicating the destination for the claim data;
select the destination for the claim data based on the final destination prediction; and
route the claim data to the destination.

17. The computer-implemented method of claim 3, further comprising:
receiving, by the one or more processors, additional data indicating downstream impacts of routing the claim data to the destination based on the final destination prediction generated via the claim router; and
re-training, by the one or more processors, the machine learning model based on the additional data,
wherein the additional data indicates at least one of:
whether the claim data was transferred from the destination to a second destination following routing of the claim data to the destination, or
whether operational data associated with processing of the claim data at the destination met corresponding performance targets.

18. The computer-implemented method of claim 3, wherein adjusting the loss report based on the value for the empty field, provided based on display of the at least one user interface element, causes:
an increase in the confidence level of the final destination prediction generated by the claim router, and
a reduction of a likelihood of a downstream transfer of the claim data between the destinations.

19. The computer-implemented method of claim 18, wherein the reduction of the likelihood of the downstream transfer of the claim data between the destinations reduces usage of at least one of network bandwidth, processing cycles, or memory associated with the downstream transfer.

20. The computer-implemented method of claim 1, wherein the preliminary destination prediction and the one or more theoretical destination predictions:
are simulated destination predictions that are generated during the communication session, and
are different from the final destination prediction that the claim router generates to determine the destination for the claim data following the completion of the communication session.

\* \* \* \* \*